(12) United States Patent
Rodger et al.

(10) Patent No.: US 10,657,169 B2
(45) Date of Patent: *May 19, 2020

(54) SYSTEMS, METHODS, AND COMPUTER READABLE MEDIUM FOR GENERATING PLAYLISTS

(71) Applicant: SPOTIFY AB, Stockholm (SE)

(72) Inventors: David Rodger, Arlington, MA (US);
Daniel Stowell, Cambridge, MA (US);
Paul E. Linton, Medford, MA (US);
Kevin Sweeney, Medford, MA (US);
Paul Lamere, Nashua, NH (US)

(73) Assignee: Spotify AB, Stockholm (SE)

( * ) Notice: Subject to any disclaimer, the term of this patent is extended or adjusted under 35 U.S.C. 154(b) by 530 days.

This patent is subject to a terminal disclaimer.

(21) Appl. No.: 15/450,230

(22) Filed: Mar. 6, 2017

(65) Prior Publication Data
US 2017/0177585 A1  Jun. 22, 2017

Related U.S. Application Data

(63) Continuation of application No. 14/213,906, filed on Mar. 14, 2014, now Pat. No. 9,626,436.

(60) Provisional application No. 61/798,745, filed on Mar. 15, 2013.

(51) Int. Cl.
*G06F 16/438* (2019.01)
*G06F 16/638* (2019.01)
*G06F 16/23* (2019.01)

(52) U.S. Cl.
CPC ...... *G06F 16/4387* (2019.01); *G06F 16/2365* (2019.01); *G06F 16/639* (2019.01)

(58) Field of Classification Search
CPC ............. G06F 16/4387; G06F 16/4393; G06F 16/2365; G06F 16/639
USPC .................................. 707/737, 740, 803
See application file for complete search history.

(56) References Cited

U.S. PATENT DOCUMENTS

| | | | |
|---|---|---|---|
| 7,398,274 B2 * | 7/2008 | Ittycheriah | .......... G10L 15/1822 |
| 7,627,605 B1 | 12/2009 | Lamere et al. | |
| 9,111,519 B1 | 8/2015 | Yang et al. | |
| 2006/0168340 A1 * | 7/2006 | Heller | .................. G11B 27/002 |
| | | | 709/242 |
| 2006/0282864 A1 | 12/2006 | Gupte | |

(Continued)

FOREIGN PATENT DOCUMENTS

WO       2012/107762 A1     8/2012

OTHER PUBLICATIONS

Int'l Search Report and Written Opinion issued in connection with Int'l Appl'n No. PCT/US2014/029324 dated Mar. 31, 2016 (10 pages).

(Continued)

*Primary Examiner* — Hares Jami
(74) *Attorney, Agent, or Firm* — Merchant & Gould P.C.

(57) ABSTRACT

Methods, systems and computer program products are provided for generating a playlist. An application programming interface (API) receives a request to generate a playlist, where the request includes a set of rule-primitives. A playlist engine evaluator evaluates a rule corresponding to each rule-primitive in the set of rule-primitives across a catalog of media content, calculates a cost associated with each item in the catalog of media content, and generates a playlist based on the items of the catalog having the lowest costs.

15 Claims, 6 Drawing Sheets

(56) References Cited

U.S. PATENT DOCUMENTS

| | | |
|---|---|---|
| 2007/0174866 A1 | 7/2007 | Brown et al. |
| 2008/0021577 A1 | 1/2008 | Ijichi et al. |
| 2008/0208775 A1* | 8/2008 | Vossen ................. G11B 27/031 706/12 |
| 2011/0213769 A1 | 9/2011 | Handman et al. |
| 2012/0136750 A1* | 5/2012 | Gronow ................. G06Q 30/00 705/26.7 |
| 2012/0166436 A1 | 6/2012 | Kalasapur et al. |
| 2012/0278342 A1 | 11/2012 | Purdy |
| 2014/0007146 A1* | 1/2014 | Peterson ............ H04N 21/2543 725/5 |
| 2014/0074846 A1 | 3/2014 | Moss et al. |

OTHER PUBLICATIONS

European Extended Search Report issued in connection with Appln No. 14717370.2-1507 dated May 24, 2017 (11 pages).

* cited by examiner

200 — Time Quota
206 — attribute  [Custom.liveness]
208 {
  max_quota  [4]
  min_quota  [1]
  overlap  ☐
  start_offset  [0]
  time_span  [0] d [1] h [0] m
}
214 — value  [L/Live(78 songs, 3%)]

210 — Weight  [NORMAL]
212 — Selector  [Selector Rule]
[Add Selector]

[Duplicate rule] [Copy to Clipboard] [Delete Rule]

FIG. 2

300
Frequency Map
302 — attribute | custom.category | 306 — Weight | NORMAL |

304 distribution_map
- C Current 10 %
- D Discovery 10 %
- F Full 10 %
- I Intro 70 %

Total 100 % overlap ☐
start_offset 0
time_span 0 d 4 h 0 m

308 Selector:enabled_window
Apply this rule | to the first | 10 | Songs.

Delete Selector

FIG. 3

SYSTEMS, METHODS, AND COMPUTER READABLE MEDIUM FOR GENERATING PLAYLISTS

CROSS REFERENCE TO RELATED APPLICATION

This application is a continuation application of U.S. patent application Ser. No. 14/213,906 filed Mar. 14, 2014, which claims priority to U.S. Provisional Application No. 61/798,745 filed Mar. 15, 2013, the contents of which are incorporated herein by reference.

BACKGROUND

I. Field

Example aspects described herein relate generally to media content programming and more particularly to generating playlists.

II. Related Art

Since the advent of radio, disc jockeys (DJs) have been generating lists of songs, referred to as a "playlists", to be played from broadcast stations. Typically, which songs from a catalog of available songs are included in a playlist is driven by a DJ through the careful curation of songs and libraries, as well as the custom definition of metadata. Oftentimes, a DJ will manually order the results to achieve a pleasing result. This also gives a DJ control over the pace and scheduling of the played songs.

Nowadays, playlists can be generated by a computer automatically. A conventional playlist generator applies a set of user preferences to a collection of songs to identify selections in the collection that satisfy the set of preferences. User-selected preferences may define songs that are to be included in or excluded from the playlist, particular genres or styles, and so on. They can also define a song to be used as a seed to find similar songs. To create a different playlist, a user modifies the preferences and submits them to the playlist generator. As can be understood, this methodology is still limited in functionality. The embodiments described herein solve technical challenges to provide other unique and useful functions related to playlist generation that are significant.

BRIEF DESCRIPTION

The example embodiments described herein provide methods, systems and computer program products for generating a playlist.

An application programming interface (API) receives a request to generate a playlist, where the request includes a set of rule-primitives. A playlist engine evaluator evaluates a rule corresponding to each rule-primitive in the set of rule-primitives across a catalog of media content, calculates a cost associated with each item in the catalog of media content, and generates a playlist based on the items of the catalog having the lowest costs.

BRIEF DESCRIPTION OF THE DRAWINGS

The features and advantages of the example embodiments presented herein will become more apparent from the detailed description set forth below when taken in conjunction with the following drawings.

FIG. 2 illustrates a screenshot of an interface for implementing an instantiation of a time-quota rule-primitive in accordance with an example embodiment of the invention.

FIG. 3 illustrates a screenshot of an interface for implementing an instantiation of a frequency map rule-primitive in accordance with an example embodiment of the invention.

DETAILED DESCRIPTION

The example embodiments of the invention presented herein are directed to methods, systems and computer program products for generating media content playlists, which are described herein in terms of an example playlist generator for generating song playlists. This description is not intended to limit the application of the example embodiments presented herein. In fact, after reading the following description, it will be apparent to one skilled in the relevant art(s) how to implement the following example embodiments in alternative embodiments to generate playlists for different types of media content items such as video, movies and the like.

Generally, a playlist generation device creates a playlist from a catalog of songs based on an arbitrary set of rules. The playlist generation device can generate distinct playlists by responding to implicit and explicit tunings under the control of a content programmer (e.g., a DJ), while allowing personalization for individual users to drive a unique playlist experience for each user.

Figure 1:
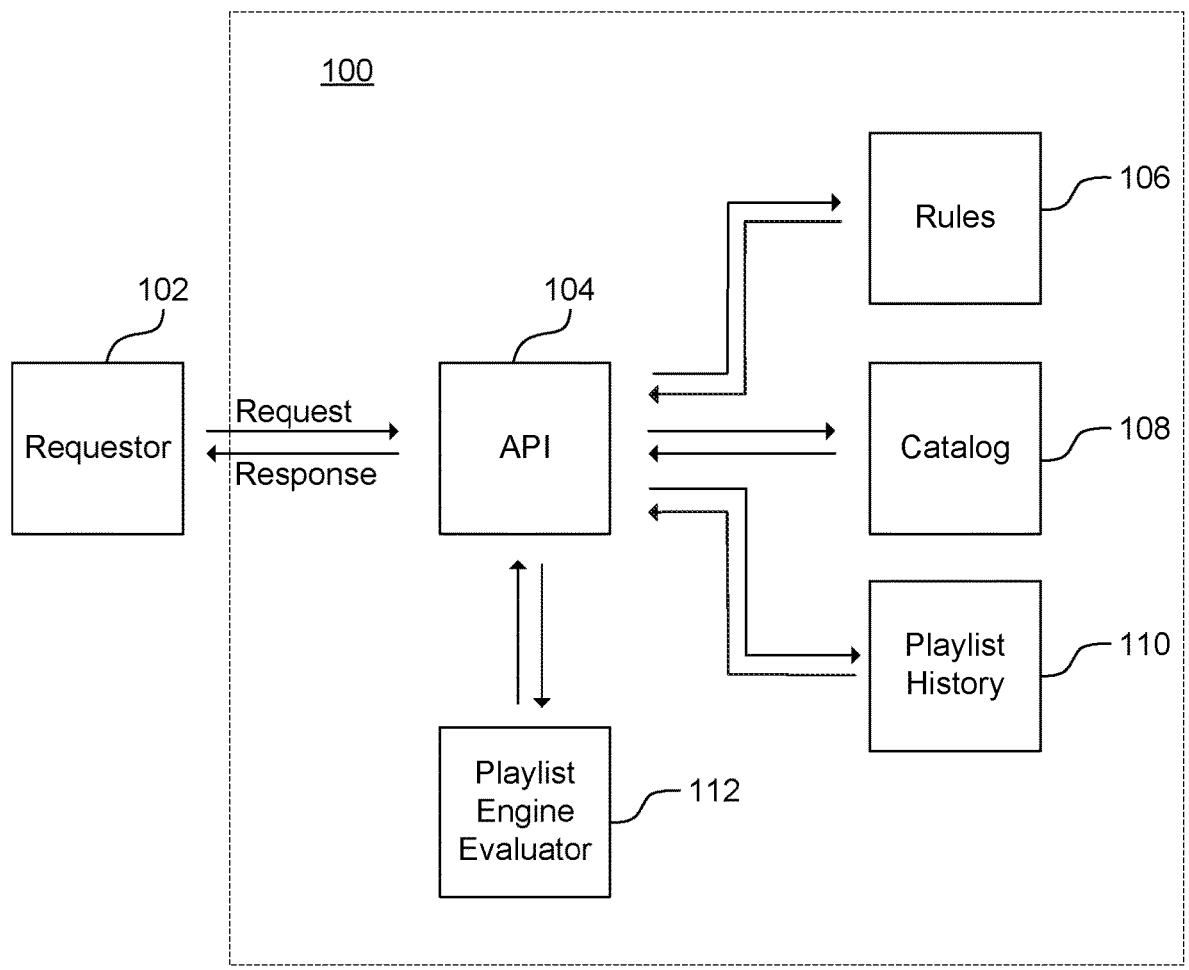
FIG. 1 illustrates an example system for generating playlists in accordance with an example embodiment of the invention.

FIG. 1 illustrates an example system 100 for generating playlists in accordance with an example embodiment of the invention. System 100 includes an application programming interface (API) 104, a rules database 106, a media content catalog database 108, a playlist history database 110 and a playlist engine evaluator 112.

API 104 receives a request from a requestor interface 102 (referred to herein simply as "requestor 102") which includes elements that identify one or more rule-primitives as well as corresponding values of parameters of the rule-primitive which are necessary to generate a playlist for a given collection of corresponding rules and constrained to a catalog of songs stored in catalog database 108. The corresponding rules are stored in a rules database 106. Upon API 104 receiving a request from a requestor, system 100 (e.g., a processor of system 100) issues the request a session identifier which can be used by requestor 102 to make additional API calls for additional playlists. Specific rules from rules database 106, catalog elements from catalog database 108, and a playlist session history from playlist session history database 110 are retrieved based on the request. Playlist engine evaluator 112, in turn, operates on this information to identify a song to be played next. System 100 then returns the playlist response to requestor 102.

Generally, a rule is based on a combination of at least one rule-primitive and values of parameters that the rule-primitive acts on. Particularly, a rule is instantiated using the rule-primitive with the parameter values it needs to run a computation.

Rule-primitives and the corresponding parameter values are customizable by requestor 102. Requestor 102 may also receive input from another user (e.g., an end user) through another interface (not shown). The rule parameters and values relate to, for example, a particular minimum, maximum or value of an attribute of a parameter, a weight given to the rule, metadata related to the media content (e.g., songs, video, movies, etc.), and the like. Table 1 below lists example rule-primitives.

As will be explained below in connection with FIG. 5, a rule may also be associated with a selector that describes the conditions under which the rule should run.

TABLE 1

| | |
|---|---|
| AvoidAlreadyPlayedSongs | Prefer songs with the oldest user.last_modified value |
| Closer | Prefer items with values closer to the given value for the attribute |
| CompositeSegueProtection | Prevent consecutive items for a defined set of attribute values |
| DualMinTimeSeparation | Maintains a minimum time separation between songs with matching values |
| DualSegueProtection | Prevent a last-first sequence of items for a dual item attribute |
| Empty | NULL |
| EnabledWindow | This selector will trigger when the current playlist position lies between start and start + length |
| Every | When used as a selector, this rule will periodically trigger based upon the current playlist position |
| FrequencyMap | Prefers tracks with a distribution of discrete attribute values according to the given discrete distribution map |
| FrequencyRange | Prefer items with value of X in range Y to Z occurring L percent of the time |
| Higher | Prefer items with a higher value for X |
| InRange | Prefer songs with a numeric attribute that falls within a given range |
| Match | This rule tests to see if an attribute matches a given value |
| MatchAny | This rule tests to see if an attribute matches any value in a given list of values |
| MaximizeSeparation | Prefer to keep tracks with the given attribute value far apart |
| MinTimeSeparation | Maintains a minimum time separation between songs with matching values |
| PlayBefore | Play a song immediately before another song based on matching attribute values |
| Position | When used as a selector, this rule will trigger when the current playlist position is the given position |
| PositionSeparation | Enforces a min/max position separation for items |
| SegueProtection | Prevent consecutive items for an attribute |
| SelfSegueProtection | Prevent consecutive items for an attribute |
| Sequence | Prefer items that are ordered by the given sequence of values |
| SequenceQuota | Enforces a sequence quota |
| Shuffle | Randomizes order of songs |
| SongSteering | Weigh songs based how close/far their attribute values are to rated song |
| Sort | Prefer items ordered by increasing value for the given attribute |
| TimeQuota | Prefers tracks that meet a defined quota over time |

Each instantiated rule (an instantiated rule referred to sometimes as simply "rule") is assigned a separate ID (rule identifier) and plural rules are gathered into a rule set which is assigned another identifier (a rule set identifier). The rule set and its corresponding rule set identifier are passed into API 104 and used, in one embodiment, to identify the next song to be played. In another embodiment, the rule set and its corresponding rule set identifier are passed into API 104 to generate a new playlist. In yet another embodiment, the playlist session can be steered by enabling or disabling one or more rule sets.

Referring again to FIG. 1, rules are stored in a rules database 106. The rules can be customized, for example, by requestor 102 through the API 104 or optionally, through another, independent API referred to as a rule API (not shown).

FIG. 2 illustrates a screenshot of an interface for implementing an instantiation of a time-quota rule-primitive 200 in accordance with an example embodiment of the invention. Generally, rule parameters include an attribute on which to operate and a value or set of values to make use of, a weight, and a selector, all of which in combination govern the constraints and effects that define a time-quota for a particular attribute.

In this example, rule parameters include an attribute 206 on which to operate and a set of values 208 to make use of, a weight 210, and a selector 212, all of which in combination govern the constraints and effects of the time-quota rule.

Particularly, in this example implementation no less than one (1) song ("min_quota") and no more than four (4) songs ("max_quota") that have a "custom.liveness" attribute value of L/Live (214) should be included in a playlist in a time span of one (1) hour. In this example, custom.liveness refers to recordings that are live. As will be understood, other attributes and related parameters and parameter values can be used.

Time-quota rule-primitive 200 also includes an optional selector 212 that is used to describe the conditions under which the rule should run ("Selector Rule"). As explained in more detail below with respect to FIG. 5, a selector can have an optional set of parameters that are used to govern the selector and a set of parameters.

FIG. 3 illustrates a screenshot of an interface for implementing an instantiation of a frequency-map rule-primitive 300 in accordance with an example embodiment of the invention. Generally, frequency-map rule-primitive 300 and its rule parameter values include an attribute 302 and values 304, a weight 306 given to the rule, and a selector 308, all of which in combination govern the constraints and effects that define a frequency distribution map of songs to be played. Particularly, given an attribute 302 (e.g., "custom.category") that, in this case, applies to every song in a catalog, a certain percentage value is ascribed to each media content item having a predefined category (e.g., C, D, F, and I) with the goal of meeting the frequency distribution over the life of the playlist. In this example, the frequency distribution map is 10% for category C (current), 10% for category D (discovery), 10% for category F (full), and 70% for category I (intro). The frequency-map rule also includes an optional selector 308 ("enabled_window") which has parameter values defining how the frequency map rule should be applied. In this example implementation, the frequency map rule should be applied only to the first 10 songs in the playlist.

Figure 4:
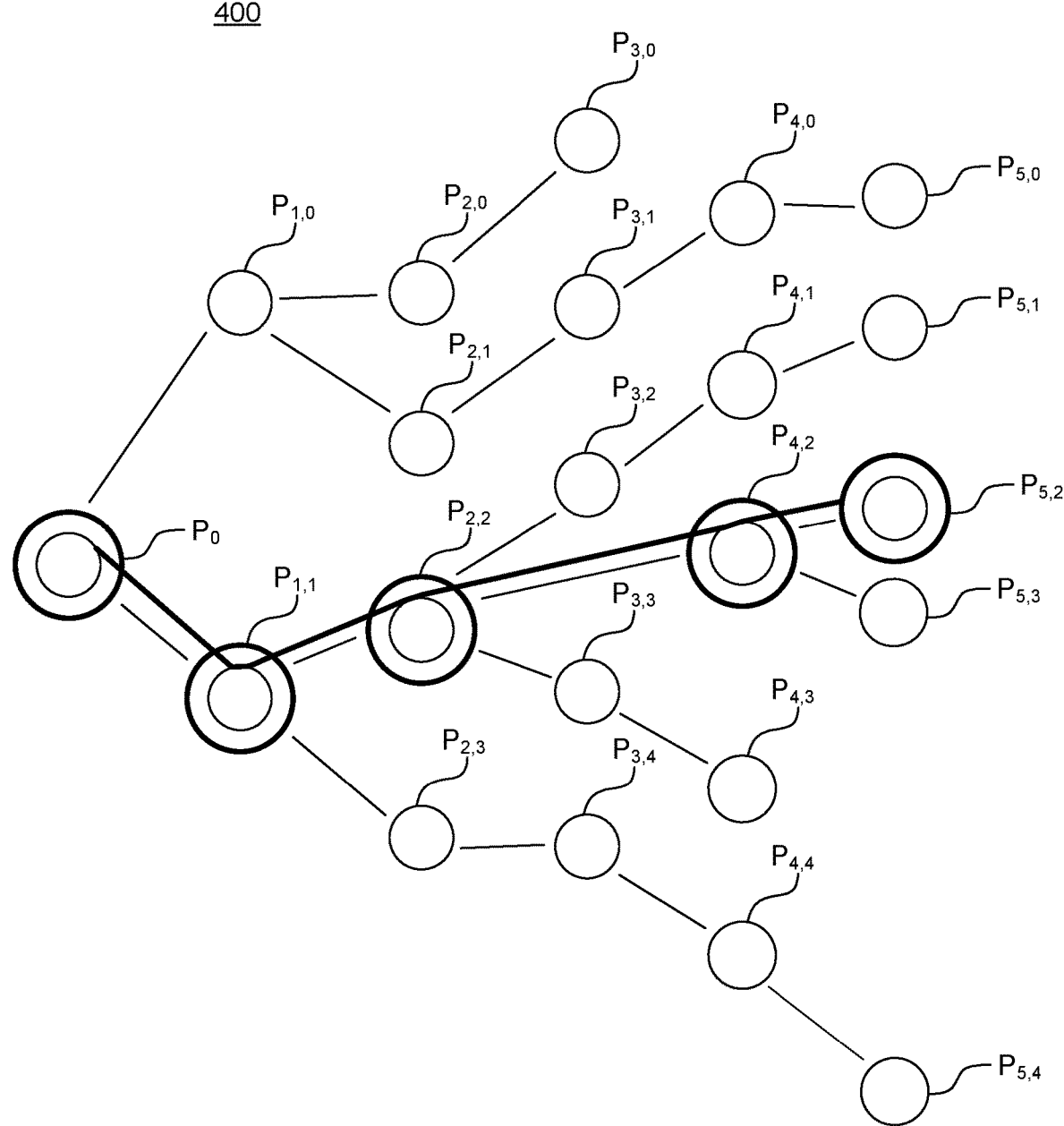
FIG. 4 shows an example beam search in accordance with an example embodiment of the invention.

FIG. 4 shows an example beam search in accordance with one embodiment of the invention. As explained above, the rules take into account one or more song attributes, parameters, play history, and context (e.g., play history, day of the week, and the like). During playlist execution, the rules stored in rules database 106 and song catalog stored in song catalog database 108 are evaluated using a heuristic search algorithm such as a beam search to identify the best candidates. The rules act on objective attributes as well as custom attributes, and user-specific attributes to return a personalized result that still reflects the experience desired by requestor 102 (e.g., DJ or content programmer).

Referring to FIG. 4, the beam search is particularly used to build a search tree 400 of possible playlist candidates P. At each level of the tree (e.g., $P_0$, $P_1$, $P_2$, $P_3$, $P_4$, $P_5$), all possible successor states are generated by applying each active rule in the rule set to each possible candidate song and summing the individual rule costs to get a total cost for each candidate song. This candidate cost is combined with the costs for predecessor songs in the tree to give a total cost for the candidate playlist at that level. The resulting successor states are sorted in order of increasing costs. In turn, the N lowest costs states (where N is an integer) are retained. Only these states are expanded in the next iteration. The process of expanding and pruning states continues until the desired playlist length is achieved Thus, only the path with lowest total cost is selected as the playlist.

Each rule can be expressed as a numeric cost when evaluated with a song. In some cases the rule is governed by the song by itself. If the cost is zero (0) it means the rule is met. The cost may also be a number that is greater than zero to indicate the extent to which the rule was not precisely met. All the rules that are part of a rule set are applied to each song and a combined score is generated for each song. The closer to zero, the better a candidate is as a song to be inserted (e.g., played) at a particular point in a playlist. A cost is computed over every song in the pool and then songs that have the lowest cost that are equally valid to be played next.

One of the components of cost can be an attribute on the song. Another component of cost can be the playlist history. For example, a rule can be: do not play a song of a particular category immediately after another song of the particular category has been played. The cost in that case thus takes into account the playlist history. Particularly, the cost of a particular content item in the catalog is adjusted based on the playlist history and thus the overall score of an item takes into account whether other items in the same category were previously played. The playlist history and the other weightings associated with the media content items and rules thus drive the selection of songs.

Cost is the sum of all the rules each of which includes a mathematical formula. For example, the time-quota rule has a specific mathematical formulation, the frequency-map rule has another specific mathematical formulation. The cost of a song is the aggregate of each of the costs of each of the rule parameter values that are applied to these formulas. The particular mathematical formula that is used thus defines the relationship of the various values, attributes and weights of a given rule-primitive and a respective target.

In an example implementation, a beam search is performed across X number of songs (where X is an integer), the tree is generated several times to calculate the cost several steps down the line. Particularly, given all of the cost functions across the (e.g., 10) songs, the songs that have high costs are pruned such that the songs with the lower costs are candidates to be played.

The beam can be run for every song and every rule set once as well as for the subsequent songs to ensure the best overall path. Thus, it is the cost of multiple steps through the playlist engine evaluator (112 of FIG. 1) executing the beam to prevent running out of songs or getting to a point where the cost is too high, for example, two or three songs into the playlist.

Aspects of the embodiments discussed above can take into account rules that are contradictory. For example, a song that is very popular but not fast may be desirable. However, many songs that are popular are fast as well. Because there is a tension between such rules (e.g., popularity vs. tempo), the beam is applied across several rules, and eventually the content having the best match is approximated.

Another example rule-primitive is referred to as the "closer" rule-primitive. The closer rule-primitive is used to locate media content (e.g., songs, videos, movies) whose attributes have values that are relatively close to a certain target value. For example, a target value of the tempo of a song may be selected (e.g., 120 beats per minute). The costs of songs that have that selected tempo (e.g., a tempo of 120 beats per minute) have a cost of zero (0) and songs whose tempo is faster or slower will have a higher cost. A tempo of 200 beats per minute, for example, will have a higher cost (e.g., 200−120=80). It will be understood that the particular unit and range of a rule-primitive will correspond to the particular rule-primitive. For example, tempo is in beats per minute and may range between 40-200 to include, for example Grave through Prestissimo).

Other rule-primitives may have binary values representing a "yes" or "no". Alternatively, a rule-primitive can have a range may vary and be, for example, from 0 to infinity, or other value defined as representing infinity in a computer such as a maximum floating point value.

As explained above, a rule-primitive can be associated with a weight (e.g., 210 of FIG. 2; 306 of FIG. 3). If a weight is associated with the rule-primitive, the combination of the weight and the calculated cost(s) are evaluated to determine how important the instantiation of the rule-primitive is. The weight is a multiplier which, when multiplied to the cost, determines whether a song should be included in the playlist. Thus a total cost that is high (e.g., high cost×low weight) will have less of a chance to being added to the playlist than a song with a lower total cost (e.g., high cost×low weight) having a high cost multiplied by a low weight will be included in the playlist.

Another example rule-primitive is the "every" rule-primitive. The "every" rule-primitive requires that every $N^{th}$ song has a particular attribute, where N is an integer. For example, a rule-primitive may require that every $N^{th}$ song has the attribute "popular." The playlist engine evaluator 112 takes into account the song attribute and the playlist history (session history) obtained from the playlist history database 110 which knows where a song is within the playlist so that the $N^{th}$ song in the playlist can be one that has the particular attribute, in this example, the attribute "popular".

Rule-primitives may be independent of the music domain and act on, among other things, attributes for the purpose generating a value. Rule-primitives allow for targeting of content items that have a particular attribute value that is close to a desired fixed value. The specific combination of rule-primitives and values is selected and defined by, for example, a user through a graphical user interface, to cause the playlist engine evaluator 112 to build a playlist that provides a desired experience. Multiple rule-primitives can thus be evaluated for any given playlist.

Figure 5:
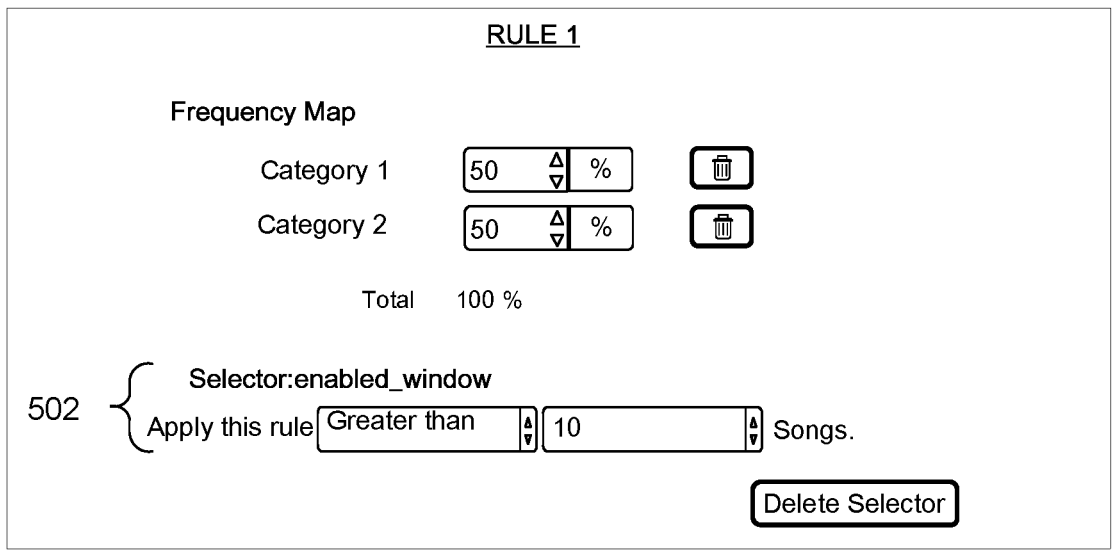
FIG. 5 is a screen shot of an example user interface showing rules with different enable window selectors in accordance with an example embodiment of the invention.
Figure 5:
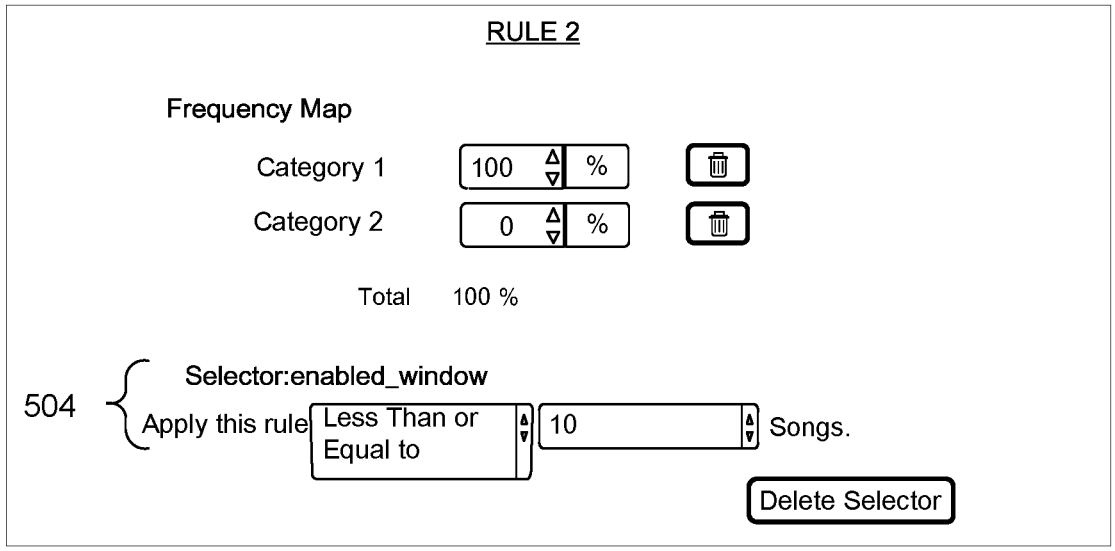
Figure 5:
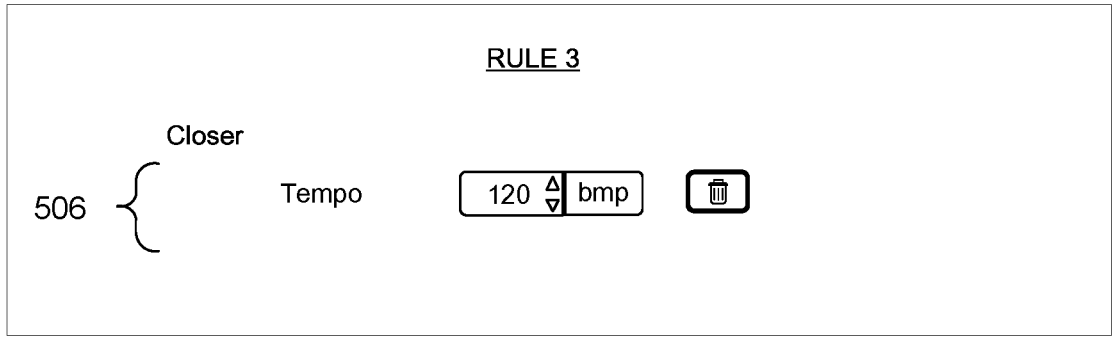

FIG. 5 is a screen shot of an example user interface according to an example embodiment of the invention. According to this aspect, rule sets can be defined that boost behavior after a user interaction, to ensure that the next song in the playlist is an exceptional match to provide the best user experience.

As explained above, rules have rule-primitives, specific parameters, a weight and a selector. A selector is a pre-condition that gets evaluated to decide whether the rule should be used in the cost computation. The selector is another computation function that will evaluate to either true or false. If the selector is true then the rule is used in the song-cost computation. If the selector is false then the rule is ignored.

In this example, a particular rule can be applied during predetermined periods of a playlist session. This allows a user (e.g., DJ or content programmer) to generate a particular experience.

As shown in FIG. 5, the interface includes selectors 502 and 504 associated with two rules that have been defined as RULE 1 and RULE 2, respectively. In this example implementation, the selectors are using the rule-primitive parameter referred to as "enabled_window". These example selectors in particular define a criterion to be evaluated in order to determine the associated rule should be applied. In the example of FIG. 5, the RULE 2 is applied for the first N (e.g., N≤10) songs. That is, the selector of RULE 2 returns "true" if N or fewer songs within the playlist have been played and "false" if greater than N songs have been played. After RULE 2 is applied for the first N songs, the playlist reverts back to a different rule set, in this case RULE 1. Thus, the selector can be seen as a wrapper around a rule. If the selector evaluates to true, then the rule operates. It should be understood that other rule-primitives and rule-primitive parameters and parameter values can be implemented and still be within the scope of the invention.

Optionally, additional rules which do not have selectors can be applied in conjunction with rules that do. For example, RULE 3 of FIG. 5 is a rule that seeks songs having a tempo of 120 beats per minute. RULE 3 applies to the entire playlist because it does not have a selector. Thus, the rule selector operator operates at the rule level and the song score is the sum of all rules that are selected. This allows rules to be generated that take into account, for example, the history of the playlist and user interface desires. The rule sets are not one set of static rule sets. They can be changed or boosted during the playlist session by using the above-described enabled_windows feature, which allows a rule to be active for only a certain set of songs.

In terms of cost, in the example shown in FIG. 5 for instance, the selector enable_window rule-primitive is set to determine whether less than 10 songs in the history have been played. If true, playlist engine evaluator 112 returns a cost of zero or otherwise returns a cost of one (1). In an example implementation shown in FIG. 5, a user (e.g., content programmer or DJ) can use the interface to decide what selector to assign to each rule, if any. For each song (i.e., candidate) that exists in the catalog database 108, each rule is run against the song to compute its cost, the computation of which takes into account the selector parameter value.

As explained above, in the example implementation of FIG. 5, two rules are created. RULE 1 is a frequency-map rule having a distributions: Category 1 has a distribution of 50% and category 2 has a distribution of 50%. Category 1 can be, for example, genre "disco" and category 2 can be, for example, genre "rock". The frequency map also has selector "enabled_window" set to greater than 10. RULE 2 is also a frequency-map rule having two categories, but the distribution of category 1 is 100% and the distribution of category 2 is 0%, respectively. RULE 2 also has a selector, enable_window, set at less than or equal to 10 songs. RULE 2 represents the behavior that someone is listening (first 10 songs) and then RULE 1 falls back to a different behavior (e.g., after 10 songs). RULE 3 is based on the Closer rule-primitive which seeks songs having approximately 120 beats per minute. RULE 3 does not have a selector and thus operates on all songs in the playlist regardless of position.

The example embodiments described above such as, for example, the systems and procedures depicted in or discussed in connection with FIGS. 1-5 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 6:
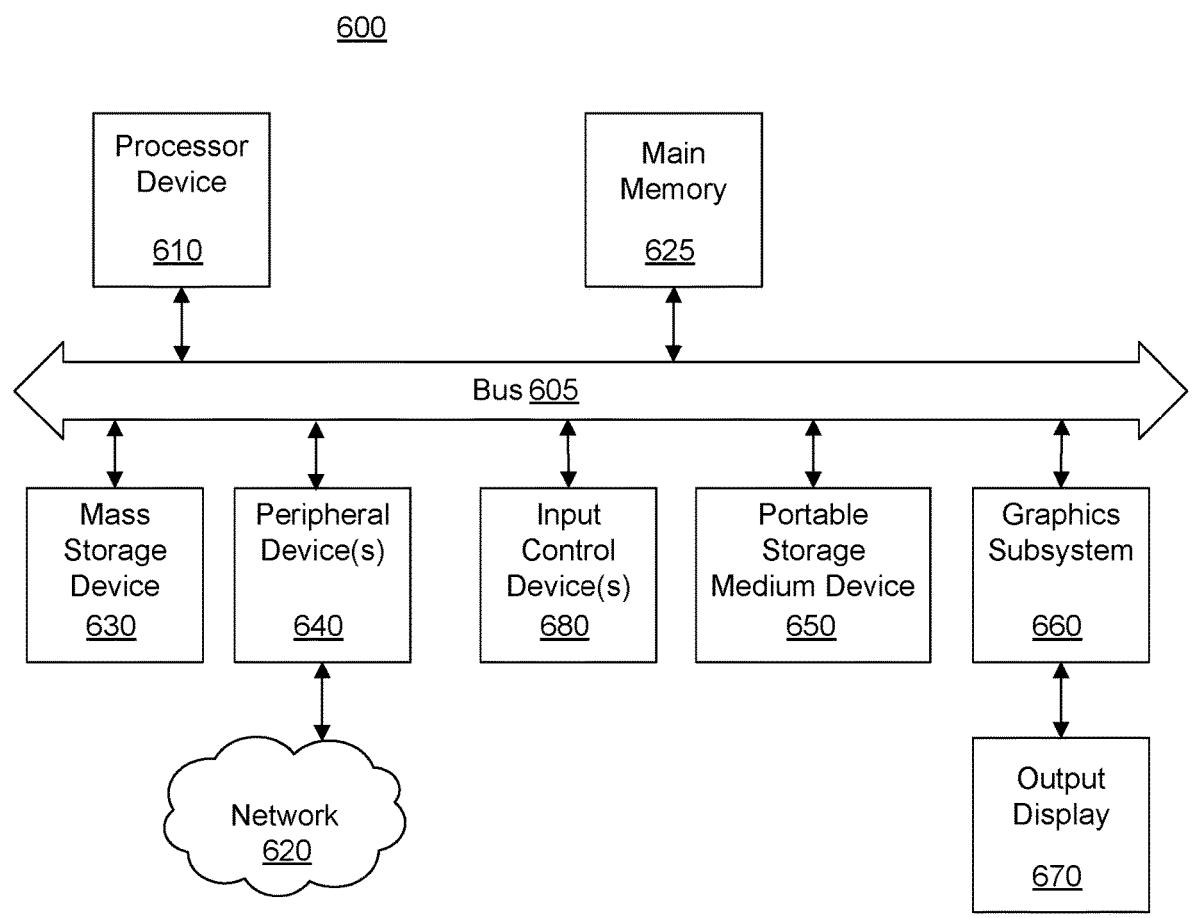
FIG. 6 is a block diagram of a general and/or special purpose computer in accordance with some of the example embodiments of the invention.

FIG. 6 is a block diagram of a general and/or special purpose computer 600, in accordance with some of the example embodiments of the invention. The computer 600 may be, for example, a user device, a user computer, a client computer and/or a server computer, among other things.

The computer 600 may include without limitation a processor device 610, a main memory 625, and an interconnect bus 605. The processor device 610 may include without limitation a single microprocessor, or may include a plurality of microprocessors for configuring the computer 600 as a multi-processor system. The main memory 625 stores, among other things, instructions and/or data for execution by the processor device 610. The main memory 625 may include banks of dynamic random access memory (DRAM), as well as cache memory.

The computer 600 may further include a mass storage device 630, peripheral device(s) 640, portable storage medium device(s) 650, input control device(s) 680, a graphics subsystem 660, and/or an output display 670. For explanatory purposes, all components in the computer 600 are shown in FIG. 6 as being coupled via the bus 605. However, the computer 600 is not so limited. Devices of the computer 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer 600. In some embodiments, the software for storing an internal identifier in metadata may be stored on a portable storage medium, and may be inputted into the computer 600 via the portable storage medium device 650. The peripheral device(s) 640 may include any type of computer support device, such as, for example, an input/output (I/O) interface configured to add additional functionality to the computer 600. For example, the peripheral device(s) 640 may include a network interface card for interfacing the computer 600 with a network 620.

The input control device(s) 680 provide a portion of the user interface for a user of the computer 600. The input control device(s) 680 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 600 may include the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer 600 may represent a broad category of a computer component of a general and/or special purpose computer. Components of the computer 600 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the non-transitory computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. An apparatus for generating a playlist, comprising:
   a processor coupled to a memory and a catalog database, and configured to function as:
   a playlist engine evaluator configured to:
   evaluate a rule corresponding to each rule-primitive in a set of rule-primitives across a catalog of media content stored in the catalog database;
   evaluate a set of corresponding weights respectively associated with one or more rule-primitives;
   calculate a rule cost associated with each item in the catalog of media content and the weight associated with the corresponding rule-primitive; and
   generate a playlist based on the items of the catalog having the lowest rule costs.

2. The apparatus according to claim 1, wherein the playlist engine evaluator is further configured to compute, for each item of the catalog, a plurality of rule costs associated with a corresponding plurality of rules, and
   accumulate the plurality of costs for each item.

3. The apparatus according to claim 1, wherein the playlist engine evaluator is further configured to calculate the rule cost of each item in the catalog based on a playlist history.

4. The apparatus according to claim 1, wherein the playlist engine evaluator processes the rules across each item in the catalog iteratively using a heuristic search algorithm.

5. The apparatus according to claim 4, wherein the heuristic search algorithm is a beam search algorithm.

6. A method for generating a playlist, comprising the steps of:
   evaluating a rule corresponding to each rule-primitive in a set of rule-primitives across a catalog of media content stored in a content database;
   evaluating a set of corresponding weights respectively associated with one or more rule-primitives;
   calculating a rule cost associated with each item in the catalog of media content and the weight associated with the corresponding rule-primitive;
   generating a playlist based on the items of the catalog having the lowest rule costs.

7. The method according to claim 6, further comprising the steps of:
   computing for each item of the catalog a plurality of rule costs associated with a corresponding plurality of rules; and
   accumulating the plurality of rule costs for each item.

8. The method according to claim 6, wherein a playlist history is an input to the calculating and the rule cost associated with each item is adjusted based on previously played items.

9. The method according to claim 6, wherein, the rules are performed across each item in the catalog iteratively using a heuristic search algorithm.

10. The method according to claim 9, wherein the heuristic search algorithm is a beam search algorithm.

11. A non-transitory computer-readable medium having stored thereon one or more sequences of instructions for causing one or more processors to perform:
    evaluating a rule corresponding to each rule-primitive in the set of rule-primitives across a catalog of media content stored in a content database;
    evaluating a set of corresponding weights respectively associated with one or more rule-primitives;
    calculating a rule cost associated with each item in the catalog of media content and the weight associated with the corresponding rule-primitive; and
    generating a playlist based on the items of the catalog having the lowest rule costs.

12. The computer-readable medium of claim 11, further having stored thereon a sequence of instructions for causing the one or more processors to perform:
    computing for each item of the catalog a plurality of rule costs associated with a corresponding plurality of rules; and
    accumulating the plurality of rule costs for each item.

13. The computer-readable medium of claim 11, wherein a playlist history is an input to the calculating and the rule cost associated with each item is adjusted based on previously played items.

14. The computer-readable medium of claim 11, wherein, the rules are performed across each item in the catalog iteratively using a heuristic search algorithm.

15. The computer-readable medium according to claim 14, wherein the heuristic search algorithm is a beam search algorithm.

* * * * *